United States Patent [19]

Daniele et al.

[11] Patent Number: 4,733,252
[45] Date of Patent: Mar. 22, 1988

[54] BEAM SPLITTER FOR MULTIBEAM A/O MODULATORS AND PRINTER SYSTEMS

[75] Inventors: Joseph J. Daniele, Pittsford; Kwok-leung Yip, Webster, both of N.Y.

[73] Assignee: Xerox Corporation, Stamford, Conn.

[21] Appl. No.: 31,961

[22] Filed: Mar. 30, 1987

[51] Int. Cl.$^4$ .................. G01D 9/42; G01D 15/14; H04N 1/21
[52] U.S. Cl. .................. 346/108; 346/160; 358/296
[58] Field of Search .......... 346/108, 107 R, 76 L, 346/160; 358/296, 300, 302

[56] References Cited

U.S. PATENT DOCUMENTS

| | | | |
|---|---|---|---|
| 3,943,369 | 3/1976 | Saeva | 350/397 |
| 4,345,258 | 8/1982 | Tsai | 346/76 L |
| 4,348,079 | 9/1982 | Johnson | 350/358 |
| 4,445,126 | 4/1984 | Tsukada | 346/108 |
| 4,492,436 | 1/1985 | Bergmann | 350/395 |
| 4,506,275 | 3/1985 | Maeda | 346/108 |
| 4,517,608 | 5/1985 | Maeda et al. | 358/298 |
| 4,554,561 | 11/1985 | Daniele | 346/108 |
| 4,565,426 | 1/1986 | Cullen | 350/401 |
| 4,578,689 | 3/1986 | Spencer et al. | 346/160 |
| 4,686,542 | 8/1987 | Yip | 346/108 |

Primary Examiner—E. A. Goldberg
Assistant Examiner—Mark Reinhart
Attorney, Agent, or Firm—Frederick E. McMullen

[57] ABSTRACT

A scanning system with unpolarized laser, a birefringent beam splitter to split the unpolarized beam into dual orthogonally polarized beams, a polarization insensitive unitary dual beam modulator for separately modulating the beams in accordance with discrete image signal inputs, and a control for operating the modulator at optimum acoustic power levels.

In an alternate embodiment, a quarter wave plate is inserted in the optical path between laser and beam splitter.

7 Claims, 4 Drawing Figures

BEAM SPLITTER FOR MULTIBEAM A/O MODULATORS AND PRINTER SYSTEMS

The invention relates to raster output scanning systems, and more particularly, to a raster output scanning system incorporating a novel beam splitter and dual beam modulator combination.

Raster output scanners create or write images in accordance with the image content of an image signal. Typical present day raster output scanners are xerographic based and the images are written on a photoreceptor. There, the moving photoreceptor, having been previously charged, is exposed line by line by a high intensity beam of electromagnetic radiation, such as a laser, that has been modulated in accordance with input image signal. The modulated beam is focused by suitable optical elements to a point on the photoreceptor and scanned across the photoreceptor by a scanning element such as a rotating multi-faceted polygon. As a result, latent electrostatic images representative of the input image signal are created on the photoreceptor and thereafter developed by the application of a suitable toner thereto. The developed images are then transferred to copy sheets and fixed to provide permanent copies.

As one looks to and envisions the future of raster output scanners, it seems clear that much higher copy output speeds will be needed along with better and higher image resolutions. As an answer to this need, scanning systems employing dual scanning beams are contemplated with the intent of minimizing the rotational speed requirements imposed on the scanning element such as a polygon. This would allow the life of the scanning element shaft bearings, a critical and limiting factor to the speed at which the scanning element can safely and reliably operate, to be extended. For dual beam applications, however, a unitary or one piece modulator rather than two separate modulators is considered to be desirable. Unitary modulators consist of a single modulator crystal of suitable size having two separate sets of drive electrodes such that two separate and distinct channels are formed on the same crystal. This reduces cost and optical alignment problems since only a single modulator need be located and fixed in the optical path rather than two. The problem, however, is that for this type of modulator, two very accurately positioned and balanced input beams are essential since the ability to move and adjust a separate modulator for each beam is sacrificed to obtain the advantages offered by the one piece duel modulator design.

In the prior art, U.S. Pat. No. 4,445,126 to Tsukada discloses a multi-beam image forming apparatus in which the several scan beams are derived from multi-beam laser, while U.S. Pat. Nos. 4,506,275 and 4,517,608 to Maeda disclose scanners in which the laser beam is concerted to a flat beam and impinged on a modulator. The beam is modulated by sonic waves applied to the modulator with the resulting beams of light distributed through a series of individual light transmitting fibers. U.S. Pat. No. 4,492,436 to Bergmann describes a birefringent beam splitter for dividing light in which the TE and TM polarization characteristics of the source beam are interchanged with one another between the faces of the beam splitter plate. This provides polarization independence. U.S. Pat. No. 4,565,426 to Cullen describes birefringent prism beam splitter for splitting a source beam into two separate beams. However, here additional prisms are used to compensate for wavelength dispersion of the split beams. And, U.S. Pat. No. 4,578,689 to Spencer et al, discloses a laser based printer capable of operating alternately in a high resolution, slow speed mode or a low resolution, high speed mode, mode control being effect through different clock rates.

In contrast, the present invention provides a scanning system which includes a movable recording member on which images are written in accordance with image signals using a beam of high intensity light, modulator means for modulating the beam in accordance with the image signals, and a rotating scanning element for scanning the beam output by the modulator means across the member to write images on the member, the combination which comprises: an unpolarized laser providing the beam; a beam splitter composed of a birefringent crystal interposed between the laser and the modulator means to that the unpolarized laser beam impinges on the crystal at a predetermined angle of incidence, the crystal splitting the unpolarized beam into first and second parallel beams with the polarization of the first beam being orthogonal to the polarization of the second beam; the modulator means including a substrate and two discrete drive electrodes cooperable to provide two separate modulating channels, the first and second beams output by the beam splitter impinging at discrete modulating channel entry points on the substrate, each of the drive electrodes receiving image signals independently of the other drive electrode whereby the separate modulating channels modulate the first and second beams independently to provide two distinct imaging beams for writing on the member, the modulator substrate being comprised of a material that is substantially insensitive to the orthogonal polarization of the first and second beams impinging thereon.

IN THE DRAWINGS

In the ensuing description, the fast scan direction refers to the direction in which the scanning beam is scanned across the recording member while the slow or cross scan direction refers to the direction of movement of the recording member which is typically at right angles to the fast scan direction.

Figure 1:
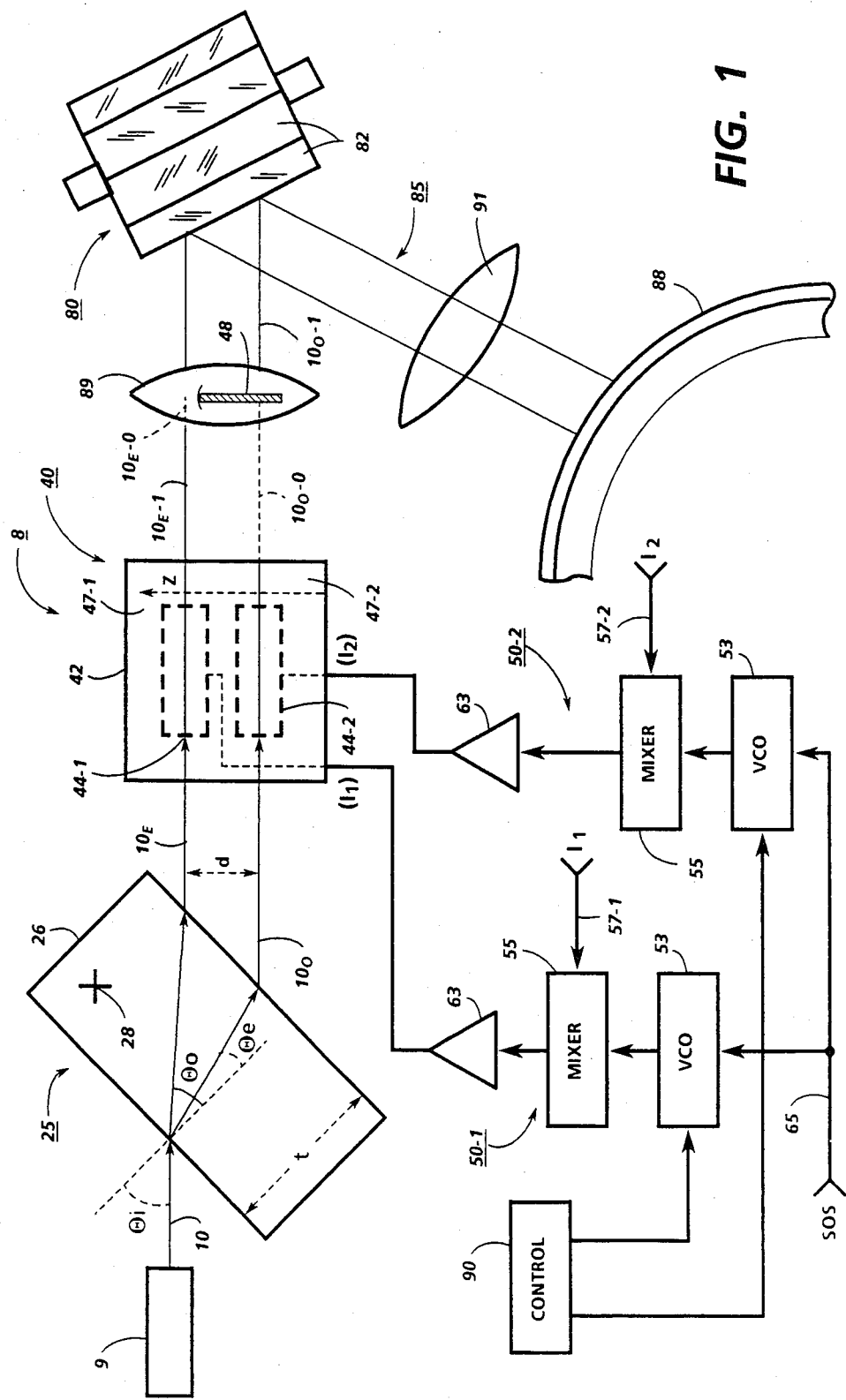
FIG. 1 is a schematic view of the scanning system of the present invention where the beam from a non-polarized laser source is split into two orthogonally polarized beams by a beam splitter with each beam modulated in accordance with separate image signal inputs by a polarization insensitive dual beam modulator.

Referring to FIG. 1, there is shown the multi-beam raster output scanning system, designated generally by the numeral 8, incorporating the present invention. Scanning system 8 includes a suitable light source 9 in the form of an unpolarized gas laser such as a helium-cadmium or a helium-neon laser for producing a beam 10 of high intensity light. A diode laser with appropriate optics may also be used.

The unpolarized beam 10 output by light source 9 passes through a beam splitter 25 which splits the beam 10 into two parallel accurately spaced and well balanced beams $10_O$ and $10_E$ as will appear. From beam splitter 25, beams $10_O$ and $10_E$ are input to a dual channel modulator 40 where the beams $10_O$ and $10_E$ are individually modulated in accordance with two image signals $I_1$ and $I_2$. Ordinarily, image signals $I_1$ and $I_2$ represent two image scan lines or scan line pairs.

The modulated beam pair output by modulator 40 are then imaged onto a recording medium such as photoreceptor 88 of a xerographic system in the scan direction by imaging optics 85. Imaging optics 85 includes an anamorphic lens 89 for focusing the first order beams $10_O$-1 and $10_E$-1 onto the facets 82 of a rotating scanning polygon 80 located at the Fourier transform plane of lens 89 and an anamorphic imaging lens 91 for imaging the reflected beams onto photoreceptor 88. As will be understood, modulator 40 and photoreceptor 88 are in optical conjugate planes with polygon 80.

Other scanning elements such as a holographic disc or hologon, etc., may be used in place of polygon 80 as will be understood.

Modulator 40 is an acousto-optic (A/O) type modulator having a substrate 42 with a thickness sufficient to permit two separate, distinct, and non-overlapping modulating channels or sections 47-1, 47-2 to be created having a center-to-center separation sufficient to prevent, or at least minimize, acoustic interference such as crosstalk between the neighboring acoustic channels 47-1, 47-2. A separate transducer or drive electrode 44-1, 44-2 is provided for each channel section 47-1 and 47-2. Electrodes 44-1, 44-2, which may, for example, comprise electrically driven piezoelectric elements, are disposed on one end of the substrate 42 by suitable means (as for example by evaporation) substantially opposite the area where modulating channels 47-1, 47-2 are desired.

As will be understood, in this type of modulator, each electrode 44-1, 44-2, on application of an electrical drive signal, generates an acoustic wave which travels through the portion of the substrate 42 opposite the electrode and perturbs the index of refraction in that part of the substrate. The refractive index perturbation acts as a phase grating in which the grating period is equal to the drive or acoustic frequency. Grating density is proportional to the amplitude of the drive signal applied to electrodes 44-1, 44-2, while the wavefronts are segmented by the video signal characteristics. For a video signal consisting of a stream of "1"s and "0"s, it is assumed that the spacing between segmented wavefronts is determined by the "0" time of the video signal. Alternately, the "1" time may be used instead.

The incoming beams $10_O$ and $10_E$ are focused to the desired spot size at modulator 40 opposite the modulating channels 47-1, 47-2 respectively, the beams being separated so that each beam entering substrate 42 of modulator 40 passes through a region in which each acoustic wave is distinct. Each beam $10_O$ and $10_E$ entering modulator 40 interacts with the acoustic wave generated by the electrode 44-1 or 44-2 for that beam and is modulated by the input video signals to the electrode.

The acousto-optic interaction is in the form of Bragg diffraction and, where no signal is applied to the electrodes 44-1, 44-2, only a nondiffracted output or zero order beam $10_O$-0 or $10_E$-0 is emitted by modulator 40. Application of a signal to the electrodes 44-1, 44-2 produces first order diffracted beams $10_O$-1 or $10_E$-1 which are used to write images. The zero-order beams $10_O$-0 or $10_E$-0 are absorbed by a beam stop 48.

As will be understood, the intensity of the beams is a function of the amplitude of the drive signal applied to electrodes 44-1, 44-2. Further, the approximate angle of diffraction existing between the first-order and zero-order beams is directly proportional to the driving (rf) frequency, the wavelength of the incident light, and inversely proportional to the velocity of propagation of the acoustic pulses in the modulator substrate 42.

Each electrode 44-1, 44-2 has a driver circuit 50-1, 50-2 respectively with a Voltage Controlled Oscillator (VCO) 53 for generating high frequency rf signals. The output of VCO 53 is fed to one input of a suitable mixer 55 for mixing the rf signal output of VCO 53 with the incoming video image signals. As will be understood, the video image signals may be derived from any suitable source such as a memory, communication channel, raster input scanner, etc. The video image signals are input through channels 57-1, 57-2 to a second input of mixer 55.

The output of mixer 55 is amplified by a suitable signal amplifier 63, the amplified output of each driver circuit 50-1, 50-2 being coupled to the drive terminals of transducers 44-1, 44-2 respectively. Startup of driver circuits 50-1, 50-2 and the input of video image signals is controlled by a Start Of Scan (SOS) signal in line 65. The SOS signal may be produced for example by placing a suitable photosensor in the scanning path of beams 10-1, 10-2 and using the output signal of the photosensor as a reference to identify the starting point at which writing of the image lines commences.

Alternately, the End Of Scan (EOS) signal may be used either individually or in combination with the SOS signal to control writing of the image lines.

Beam splitter 25 consists of a single slab of a birefringent material 26 such as calcite in the optic path between the unpolarized laser 9 and the acousto-optic modulator 40. As will be understood, beam splitting is due to the splitting of the unpolarized beam into an ordinary beam $10_O$ and an extraordinary beam $10_E$ in the beam splitter material 26, the unpolarized beam 10 from laser 9 falling on the calcite crystal 26 which is disposed such that the crystal optic axis 28 is as shown in FIG. 1. Inside the crystal 26, the electric field vector vibrations for the ordinary beam $10_o$ are always perpendicular to the crystal optic axis 28 and parallel to the crystal optic axis 28 for the extraordinary beam $10_E$.

Beams $10_O$ and $10_E$ may be described by indices $n_o$ and $n_e$. In the plane considered, each beam obeys Snell's law, i.e.:

$$\sin \theta_o = \sin \theta_i / n_o$$

$$\sin \theta_e = \sin \theta_i / n_e$$

where $\theta_i$ is the angle of incidence.

By algebraic manipulation, the perpendicular distance d between the two emerging beams $10_O$ and $10_E$ can be expressed in terms of the angle of incidence $\theta_i$ and the thickness t of the beam splitter crystal 26 as:

$$d = t \sin \theta_i - \cos \theta_i \{1/n_e \cos \theta_e - 1/n_o \cos \theta_o\}$$

Figure 2:
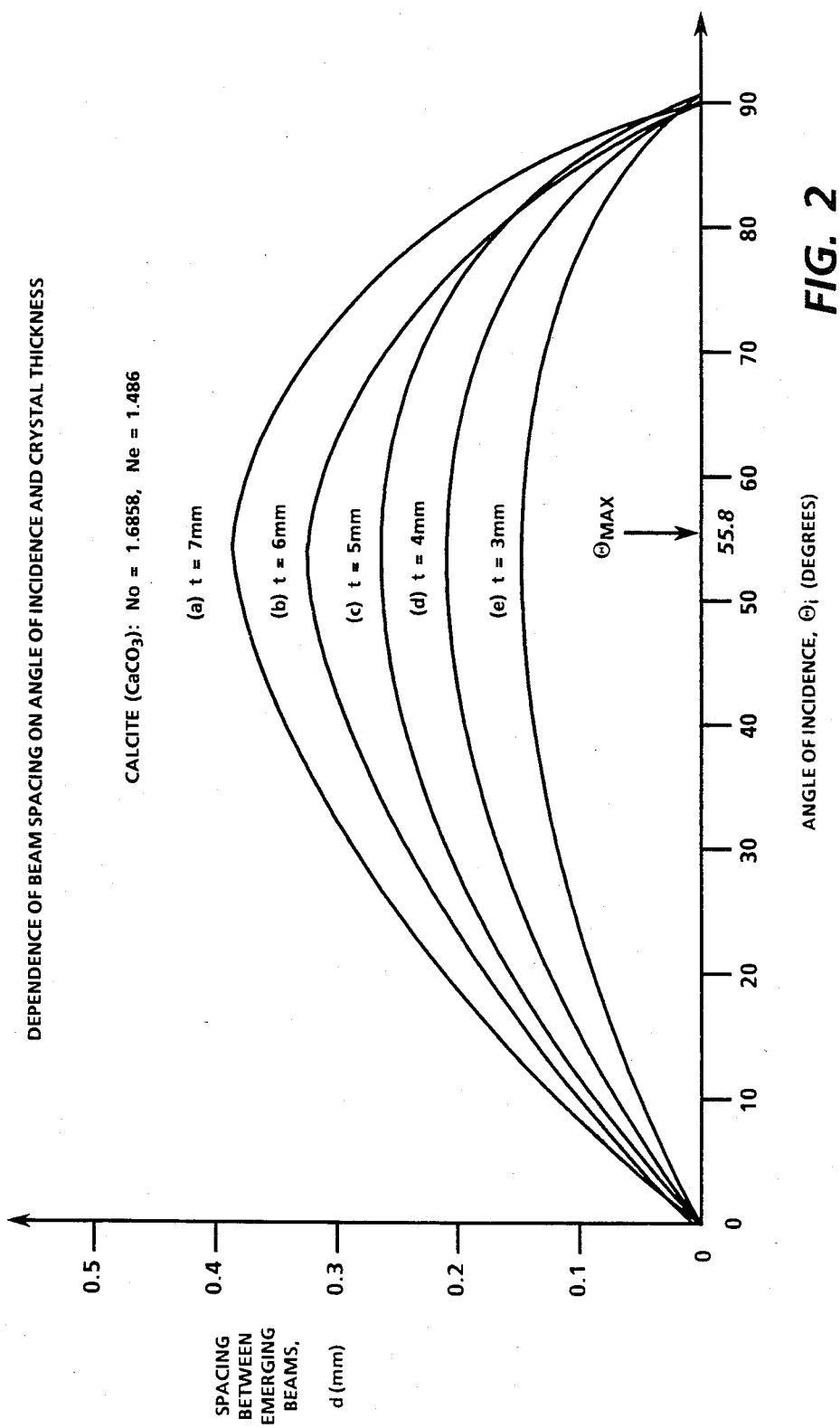
FIG. 2 is a graph depicting the relationship between the angle of incidence of the beam impinging on the beam splitter shown in FIG. 1 and the distance separating the emerging beams from one another.

Given $n_o = 1.658$ and $n_e = 1.486$ for the crystal 26, the dependence of distance d on $\theta_i$ and thickness t can be calculated. Examples for crystal thicknesses t of 3, 4, 5, 6, and 7 mm. are illustrated in FIG. 2 where, as can be seen, for a given thickness of crystal 26, the maximum spacing of the emerging beams $10_O$ and $10_E$ occurs at an angle of incidence of approximately 55.8° ($\theta$ max). Further, near the optimum angle of incidence ($\theta$ max), spacing between beams $10_O$ and $10_E$ is quite insensitive to the angle of incidence $\theta$. For example at t=4 mm. and $\theta_i = \theta$ max. = 55.8°, beam spacing is about 0.212 mm., which is ordinarily sufficient for present scanning systems. Further, the alignment tolerance of $\theta_i$ is more than ±5° for a 5 µm. variation in beam spacing. Thus, for a typical modulator, the required alignment accuracy of the optical beam at the modulator in the direction of the modulator axis 28 with respect to the center line of the electrode is about ±60 µm. Therefore, beam splitter 25 provides good accuracy in beam spacing for a dual-beam modulator, with large tolerances in both crystal thickness and optical alignment. Moreover, spacing adjustment is accurately made by adjusting the crystal angle $\theta_i$.

The polarizations of the beams $10_O$ and $10_E$ emerging from crystal 26 are orthogonal to each other. This can lead in some cases to reduced diffraction efficiency at the modulator. To avoid this problem, a modulator substrate is chosen that is insensitive to the polarization of the incident optical beam. Substrates for modulator 40 such as SF8 glass or $TeO_2$ are quite suitable.

Figure 3:
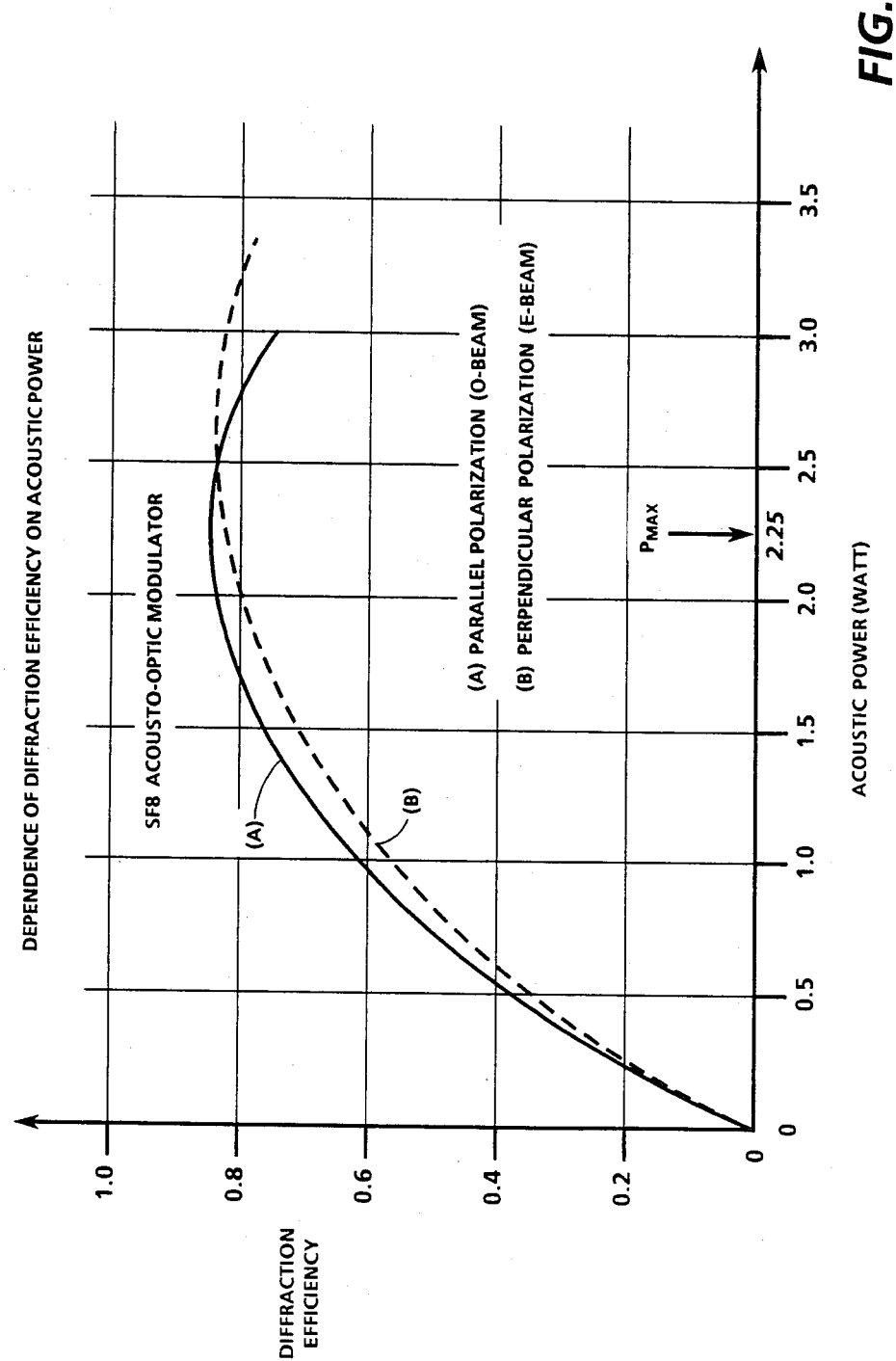
FIG. 3 is a graph depicting the relationship between diffraction efficiency, acoustic power, and optical polarization in a SF8 glass acousto optic modulator.

Referring to FIG. 3, there is shown the dependence of diffraction efficiency of a typical SF8 modulator on optical polarization. It can be seen that the diffraction efficiency is ordinarily higher where there is parallel polarization (i.e., parallel to the electrode plane) than when there is perpendicular polarization (i.e., perpendicular to the electrode plane). At a certain acoustic power level ($P_{max.}$, as shown by the arrow in FIG. 3), the diffraction efficiencies for both parallel and vertical polarizations are the same. By driving the modulator at $P_{max.}$, modulator diffraction efficiency can be made insensitive to optical polarization. This insures that the duel beams coming out of the modulator will have the same intensity.

Referring to FIG. 1, to control power to modulator 40, a controller 90 is provided to enable the potential to VCO's 53 of driver circuits 50-1 and 50-2 to be independently adjusted. This, in turn, allows the amplitude of the drive signal V applied to electrodes 44-1 and 44-2 of channels 47-1 and 47-2 respectively to be set for the optimum acoustic power level $P_{max.}$ depicted in FIG. 3.

Figure 4:
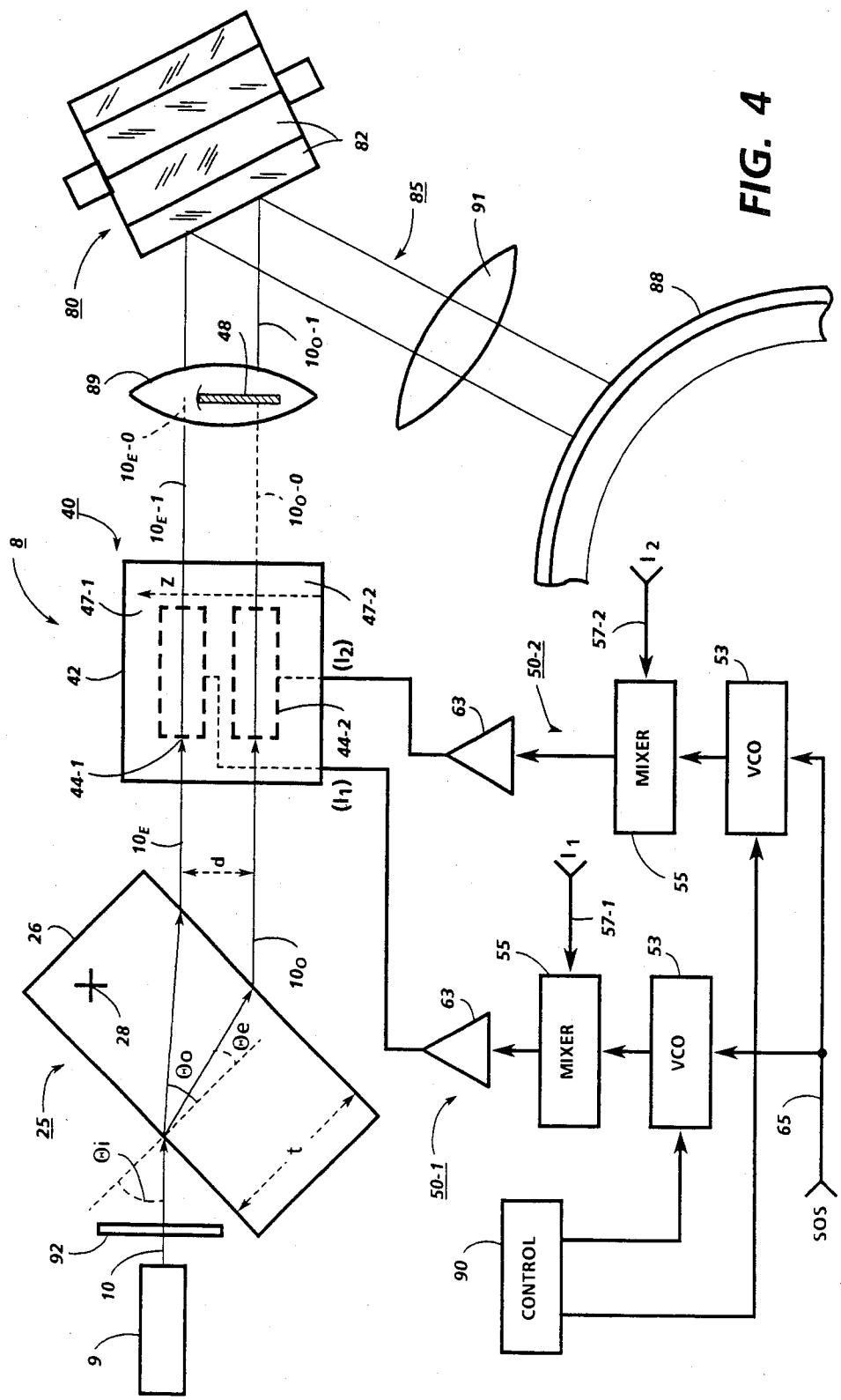
FIG. 4 is a schematic view showing an alternate embodiment in which provision is made to accommodate randomly polarized beams.

As will be understood, many low cost lasers are not randomly polarized but are instead elliptically polarized. To accommodate this, and referring to FIG. 4, where like numbers refer to like parts, a quarter wave plate 92 is provided in the optic path between laser 9 and beam splitter 25 to convert any polarization of the laser beam into circular polarization for input to beam splitter 25.

While the invention has been described with reference to the structure disclosed, it is not confined to the details set forth, but is intended to cover such modifications or changes as may come within the scope of the following claims.

What is claimed is:

1. In an electronic printing apparatus having a movable recording member on which images are written in accordance with image signals using a beam of high intensity light, modulator means for modulating said beam in accordance with the image signals, and a rotating scanning element for scanning the beam output of said modulator means across said member to write images on said member, the combination of:
    (a) a laser for providing said beam, said beam provided by said laser being unpolarized;
    (b) a beam splitter comprising a birefringent crystal interposed in the optical path of said unpolarized beam between said laser and said modulator means, said crystal being positioned so that said unpolarized laser beam impinges on said crystal at a predetermined angle of incidence, said crystal splitting said unpolarized beam into first and second parallel beams with the polarization of the first beam being orthogonal to the polarization of the second beam;
    (c) said modulator means including a substrate and two discrete drive electrodes, said substrate and said drive electrodes cooperating to provide two separate modulating channels, said first and second beams each impinging at discrete points on said substrate for input to separate ones of said modulating channels, each of said drive electrodes receiving image signals independently of the other drive electrode whereby said separate modulator channels modulate said first and second beams independently to provide two distinct imaging beams for writing on said member, said substrate being comprised of a material that is substantially insensitive to said orthogonal polarization of said first and second beams impinging thereon.

2. The apparatus according to claim 1 in which said modulator material comprises SF8 glass.

3. The apparatus according to claim 1 in which said modulator material comprises $TeO_2$.

4. The apparatus according to claim 1 in which said predetermined angle of incidence is substantially 55.8° to provide optimum spacing between said first and second beams irrespective of the thickness of said crystal.

5. The apparatus according to claim 2 including:
    (a) a source of power for driving said modulator means; and
    (b) control means for controlling said power source to drive said modulator means at a predetermined optimum power level to further enhance insensitivity of said modulator means to said first and second beam orthogonal polarizations.

6. The apparatus according to claim 1 including: means for converting any polarization of said beam into circular polarization prior to said beam striking said beam splitter.

7. The apparatus according to claim 6 in which said polarization converting means comprises a quarter wave plate between said laser and said beam splitter.

* * * * *